(12) United States Patent
Makovetzky

(10) Patent No.: US 10,063,895 B2
(45) Date of Patent: Aug. 28, 2018

(54) SYSTEM AND METHOD FOR ALLOCATING BANDWIDTH IN A NETWORK

(71) Applicant: COMIGO LTD., Yarkona (IL)

(72) Inventor: Avraham Makovetzky, Bnei-Brak (IL)

(73) Assignee: COMIGO LTD., Yarkona (IL)

( * ) Notice: Subject to any disclaimer, the term of this patent is extended or adjusted under 35 U.S.C. 154(b) by 0 days.

(21) Appl. No.: 15/263,437

(22) Filed: Sep. 13, 2016

(65) Prior Publication Data

US 2017/0188057 A1 Jun. 29, 2017

Related U.S. Application Data

(60) Provisional application No. 62/271,258, filed on Dec. 27, 2015.

(51) Int. Cl.
*H04N 7/173* (2011.01)
*H04N 21/2385* (2011.01)

(52) U.S. Cl.
CPC .............................. *H04N 21/2385* (2013.01)

(58) Field of Classification Search
CPC .................................................. H04N 21/2385
See application file for complete search history.

(56) References Cited

U.S. PATENT DOCUMENTS

| 7,207,055 | B1 | 4/2007 | Hendricks et al. |
| 8,996,713 | B2 | 3/2015 | Nilsson et al. |
| 2007/0053293 | A1 | 3/2007 | McDonald et al. |
| 2010/0128604 | A1 | 5/2010 | Appleby et al. |
| 2010/0175089 | A1* | 7/2010 | Seo ..................... H04N 5/44543 725/44 |
| 2013/0268984 | A1* | 10/2013 | Salinger ................ H04L 47/806 725/109 |
| 2014/0006237 | A1* | 1/2014 | Chiang .................. G06Q 30/04 705/34 |
| 2016/0088358 | A1* | 3/2016 | Garcia Navarro ......................... H04N 21/4826 725/46 |

FOREIGN PATENT DOCUMENTS

WO WO20140147538 9/2014

* cited by examiner

*Primary Examiner* — Oschta Montoya
(74) *Attorney, Agent, or Firm* — Marc Van Dyke; Fourth Dimension IP

(57) ABSTRACT

Devices and methods for allocating bandwidth in a data communication network having available bandwidth, particularly when allocating bandwidth for data of more than one video content item.

10 Claims, 5 Drawing Sheets

SYSTEM AND METHOD FOR ALLOCATING BANDWIDTH IN A NETWORK

RELATED APPLICATION

The present application gains priority from U.S. Provisional Patent Application 62/271,258 filed Dec. 27, 2015 and entitled "Bandwidth Allocation Based on Media Type", which is incorporated herein by reference as if fully set forth herein.

FIELD AND BACKGROUND OF THE INVENTION

The invention, in some embodiments, relates to the field of bandwidth allocation, and more particularly to devices and methods for allocating bandwidth for data of video content items of two different types, based on a preference of the user for each of the different types of video content items.

Despite the impressive improvements to data communication networks and to bandwidth allocation techniques which have occurred over the years, insufficient bandwidth continues to be a major concern for media consumers, and particularly for consumers of video content. Specifically, although the bandwidth available to networks has increased significantly, so have the needs increased, particularly since a large part of the data transmitted in a network or communication system nowadays is high-quality and high-resolution video, which requires much bandwidth for transmission.

Currently, due to the lack of sufficient bandwidth, communication bottlenecks and delays occur, resulting in interruptions in video content being viewed by the users and in user frustration. Such bottlenecks and delays occur both in large communication networks, such as in mass-transit systems like airplanes, cruise ships, and trains, where many users share the available bandwidth, and in small home networks in which several family members watch different video content items on different display devices.

There is thus a need for devices and methods which will allocate bandwidth for multiple video content items based at least partially on user preferences for the different types of video content items, such that each user experiences fewer delays and/or less cumulative delay time in video content items for which he has reduced tolerance for delays.

SUMMARY OF THE INVENTION

Some embodiments of the invention relate to devices and methods for allocating bandwidth for data of video content items of two different types, based on a preference of the user for each of the different types of video content items.

According to an aspect of some embodiments of the invention, there is provided a method for allocating bandwidth in a data communication network having available bandwidth, the method including:

a. receiving data of a first video content item having a first content type addressed to a first user in the network;
b. receiving data of a second video content item having a second content type addressed to a second user in the network;
c. allocating a first portion of the available bandwidth for transmission of the data of the first video content item to the first user and a second portion of the available bandwidth for transmission of the data of the second video content item to the second user, wherein a bandwidth of the first portion of the available bandwidth is dependent on at least one preference of the first user for the first content type and a bandwidth of the second portion of the available bandwidth is dependent on at least one preference of the second user for the second content type, wherein the bandwidth of the second portion is different from the bandwidth of the first portion; and
d. transmitting the data of the first video content item to the first user at the bandwidth of the first portion of the available bandwidth concurrently with transmitting the data of the second video content item to the second user at the bandwidth of the second portion of the available bandwidth.

In some embodiments, the method further includes obtaining the preference of the first user for the first content type based on content of a user profile of the first user.

In some embodiments, obtaining the preference of the first user for the first content type includes retrieving the preference of the first user for the first content type from the user profile for the first user, which preference was defined by the first user. In other embodiments, obtaining the preference of the first user for the first content type includes retrieving the preference of the first user for the first content type from the user profile for the first user, which preference was automatically generated in the user profile based on a history of content item consumption of the first user.

In some embodiments, obtaining the preference of the first user for the first content type includes automatically generating the preference of the first user for the first content type based on a history of content item consumption of the first user.

In some embodiments, the method further includes determining the preference of the first user for the first content type based on a tolerance level exhibited by video content consumers when encountering a delay while viewing content of the first content type. In some embodiments, the video content consumers share at least one characteristic with the first user.

In some embodiments, the method further includes determining the preference of the first user for the first content type based on a tolerance level exhibited by the first user when encountering a delay while viewing content of the first content type.

In some embodiments, the method further includes determining the preference of the first user for the first content type based on at least one attribute of the first user. In some embodiments, the at least one attribute of the first user is one of an age, a gender, and a geographic location of the first user.

In some embodiments, the method further includes determining the preference of the first user for the first content type based on feedback provided by the first user in response to a previous consumption of content of the first content type.

In some embodiments, the method further includes obtaining the preference of the second user for the second content type based on content of a user profile of the second user.

In some embodiments, obtaining the preference of the second user for the second content type includes retrieving the preference of the second user for the second content type from the user profile for the second user, which preference was defined by the second user. In other embodiments, obtaining the preference of the second user for the second content type includes retrieving the preference of the second user for the second content type from the user profile for the second user, which preference was automatically generated in the user profile based on a history of content item consumption of the second user.

In some embodiments, obtaining the preference of the second user for the second content type includes automatically generating the preference of the second user for the second content type based on a history of content item consumption of the second user.

In some embodiments, the method further includes determining the preference of the second user for the second content type based on a tolerance level exhibited by video content consumers when encountering a delay while viewing content of the second content type. In some embodiments, the video content consumers share at least one characteristic with the second user.

In some embodiments, the method further includes determining the preference of the second user for the second content type based on a tolerance level exhibited by the second user when encountering a delay while viewing content of the second content type.

In some embodiments, the method further includes determining the preference of the second user for the second content type based on at least one attribute of the second user. In some embodiments, the at least one attribute of the second user is one of an age, a gender, and a geographic location of the second user.

In some embodiments, the method further includes determining the preference of the second user for the second content type based on feedback provided by the second user in response to a previous consumption of content of the second content type.

In some embodiments, the first user and the second user are the same user, viewing the first video content item and the second video content item on two different devices or on two different display channels in a single device.

According to an aspect of some embodiments of the invention, there is provided a method for allocating bandwidth in a data communication network having available bandwidth, the method including:
 a. receiving data of a first video content item having a first content type addressed to a user in the network;
 b. responsive to receiving the data of the first video content item, allocating a first portion of the available bandwidth for transmission to the user, wherein a bandwidth of the first portion of the available bandwidth is dependent on at least one preference of the user for the first content type;
 c. transmitting the data of the first video content item to the user at the bandwidth of the first portion of the available bandwidth;
 d. receiving data of a second video content item having a second content type addressed to the user;
 e. responsive to receiving the data of the second video content item, allocating a second portion of the available bandwidth for transmission to the user, wherein a bandwidth of the second portion of the available bandwidth is dependent on at least one preference of the user for the second content type, wherein the bandwidth of the second portion is different from the bandwidth of the first portion; and
 f. transmitting the data of the second video content item to the user at the bandwidth of the second portion of the available bandwidth.

In some embodiments, the method further includes obtaining the preference of the user for the first content type based on content of a user profile of the user.

In some embodiments, obtaining the preference of the user for the first content type includes retrieving the preference of the user for the first content type from the user profile of the user, wherein the preference of the user for the first content type was defined by the user.

In some embodiments, obtaining the preference of the user for the first content type includes retrieving the preference of the user for the first content type from the user profile for the user, which preference was automatically generated in the user profile based on a history of content item consumption of the user.

In some embodiments, obtaining the preference of the user for the first content type includes automatically generating the preference of the user for the first content type based on a history of content item consumption of the user.

In some embodiments, the method further includes determining the preference of the user for the first content type based on a tolerance level exhibited by video content consumers when encountering a delay while viewing content of the first content type. In some embodiments, the video content consumers share at least one characteristic with the user.

In some embodiments, the method further includes determining the preference of the user for the first content type based on a tolerance level exhibited by the user when encountering a delay while viewing content of the first content type.

In some embodiments, the method further includes determining the preference of the user for the first content type based on at least one attribute of the user. In some embodiments, the at least one attribute includes one of an age, a gender, and a geographic location of the user.

In some embodiments, the method further includes determining the preference of the user for the first content type based on feedback provided by the user in response to a previous consumption of content of the first content type.

In some embodiments, the method further includes obtaining the preference of the user for the second content type based on content of a user profile of the user.

In some embodiments, obtaining the preference of the user for the second content type includes retrieving the preference of the user for the second content type from the user profile of the user, wherein the preference of the user for the second content type was defined by the user.

In some embodiments, obtaining the preference of the user for the second content type includes retrieving the preference of the user for the second content type from the user profile for the user, which preference was automatically generated in the user profile based on a history of content item consumption of the user.

In some embodiments, obtaining the preference of the user for the second content type includes automatically generating the preference of the user for the second content type based on a history of content item consumption of the user.

In some embodiments, the method further includes determining the preference of the user for the second content type based on a tolerance level exhibited by video content consumers when encountering a delay while viewing content of the second content type. In some embodiments, the video content consumers share at least one characteristic with the user.

In some embodiments, the method further includes determining the preference of the user for the second content type based on a tolerance level exhibited by the user when encountering a delay while viewing content of the second content type.

In some embodiments, the method further includes determining the preference of the user for the second content type based on at least one attribute of the user. In some embodiments, the at least one attribute includes one of an age, a gender, and a geographic location of the user.

In some embodiments, the method further includes determining the preference of the user for the second content type based on feedback provided by the user in response to a previous consumption of content of the second content type.

According to an aspect of some embodiments of the invention, there is provided a device for allocating bandwidth in a data communication network having available bandwidth, the device including:
   a. a transceiver for receiving data of a first video content item having a first content type addressed to a first user in the network and data of a second video content item having a second content type addressed to a second user in the network;
   b. a processor functionally associated with the transceiver; and
   c. a non-transitory computer readable storage medium for instructions execution by the processor, the non-transitory computer readable storage medium having stored:
      i. instructions to determine a preference of the first user for the first content type and a preference of the second user for the second content type;
      ii. instructions to allocate a first portion of the available bandwidth for transmission of the data of the first video content item to the first user and a second portion of the available bandwidth for transmission of the data of the second video content item to the second user, wherein a bandwidth of the first portion of the available bandwidth is dependent on at least one preference of the first user for the first content type and a bandwidth of the second portion of the available bandwidth is dependent on at least one preference of the second user for the second content type, wherein the bandwidth of the second portion is different from the bandwidth of the first portion; and
      iii. instructions to transmit, via the transceiver, the data of the first video content item to the first user at the bandwidth of the first portion of the available bandwidth concurrently with transmitting the data of the second video content item to the second user at the bandwidth of the second portion of the available bandwidth.

In some embodiments, the instructions to determine a preference of the first user for the first content type include instructions to obtain the preference of the first user for the first content type based on content of a user profile of the first user.

In some embodiments, the instructions to obtain the preference of the first user for the first content type include instructions to retrieve the preference of the first user for the first content type from the user profile for the first user, which preference was defined by the first user.

In some embodiments, the instructions to obtain the preference of the first user for the first content type include instructions to retrieve the preference of the first user for the first content type from the user profile for the first user, which preference was automatically generated in the user profile based on a history of content item consumption of the first user.

In some embodiments, the instructions to obtain the preference of the first user for the first content type include instructions to automatically generate the preference of the first user for the first content type based on a history of content item consumption of the first user.

In some embodiments, the instructions to determine a preference of the first user for the first content type include instructions to determine the preference of the first user for the first content type based on a tolerance level exhibited by video content consumers when encountering a delay while viewing content of the first content type. In some embodiments, the video content consumers share at least one characteristic with the first user.

In some embodiments, the instructions to determine a preference of the first user for the first content type include instructions to determine the preference of the first user for the first content type based on a tolerance level exhibited by the first user when encountering a delay while viewing content of the first content type.

In some embodiments, the instructions to determine a preference of the first user for the first content type include instructions to determine the preference of the first user for the first content type based on at least one attribute of the first user. In some embodiments, the at least one attribute of the first user is one of an age, a gender, and a geographic location of the first user.

In some embodiments, the instructions to determine a preference of the first user for the first content type include instructions to determine the preference of the first user for the first content type based on feedback provided by the first user in response to a previous consumption of content of the first content type.

In some embodiments, the instructions to determine a preference of the second user for the second content type include instructions to obtain the preference of the second user for the second content type based on content of a user profile of the second user.

In some embodiments, the instructions to obtain the preference of the second user for the second content type include instructions to retrieve the preference of the second user for the second content type from the user profile for the second user, which preference was defined by the second user.

In some embodiments, the instructions to obtain the preference of the second user for the second content type include instructions to retrieve the preference of the second user for the second content type from the user profile for the second user, which preference was automatically generated in the user profile based on a history of content item consumption of the second user.

In some embodiments, the instructions to obtain the preference of the second user for the second content type include instructions to automatically generate the preference of the second user for the second content type based on a history of content item consumption of the second user.

In some embodiments, the instructions to determine a preference of the second user for the second content type include instructions to determine the preference of the second user for the second content type based on a tolerance level exhibited by video content consumers when encountering a delay while viewing content of the second content type. In some embodiments, the video content consumers share at least one characteristic with the second user.

In some embodiments, the instructions to determine a preference of the second user for the second content type include instructions to determine the preference of the second user for the second content type based on a tolerance level exhibited by the second user when encountering a delay while viewing content of the second content type.

In some embodiments, the instructions to determine a preference of the second user for the second content type include instructions to determine the preference of the second user for the second content type based on at least one attribute of the second user. In some embodiments, the at least one attribute of the second user is one of an age, a gender, and a geographic location of the second user.

In some embodiments, the instructions to determine a preference of the second user for the second content type include instructions to determine the preference of the second user for the second content type based on feedback provided by the second user in response to a previous consumption of content of the second content type.

According to an aspect of some embodiments of the invention, there is provided a device for allocating bandwidth in a data communication network having available bandwidth, the device including:
  a. a transceiver for receiving data of a first video content item having a first content type addressed to a user in the network and data of a second video content item having a second content type addressed to the user;
  b. a processor functionally associated with the transceiver; and
  c. a non-transitory computer readable storage medium for instructions execution by the processor, the non-transitory computer readable storage medium having stored:
    i. instructions to determine a preference of the user for the first content type and a preference of the user for the second content type;
    ii. instructions to allocate a first portion of the available bandwidth for transmission of the data of the first video content item to the user and a second portion of the available bandwidth for subsequent transmission of the data of the second video content item to the user, wherein a bandwidth of the first portion of the available bandwidth is dependent on at least one preference of the user for the first content type and a bandwidth of the second portion of the available bandwidth is dependent on at least one preference of the user for the second content type, wherein the bandwidth of the second portion is different from the bandwidth of the first portion; and
    iii. instructions to transmit, via the transceiver, the data of the first video content item to the user at the bandwidth of the first portion of the available bandwidth and subsequently to transmit the data of the second video content item to the user at the bandwidth of the second portion of the available bandwidth.

In some embodiments, the instructions to determine the preference of the user for the first content type include instructions to obtain the preference of the user for the first content type based on content of a user profile of the user.

In some embodiments, the instructions to obtain the preference of the user for the first content type include instructions to retrieve the preference of the user for the first content type from the user profile of the user, which preference was defined by the user.

In some embodiments, the instructions to obtain the preference of the user for the first content type include instructions to retrieve the preference of the user for the first content type from the user profile for the user, which preference was automatically generated in the user profile based on a history of content item consumption of the user.

In some embodiments, the instructions to obtain the preference of the user for the first content type include instructions to automatically generate the preference of the user for the first content type based on a history of content item consumption of the user.

In some embodiments, the instructions to determine the preference of the user for the first content type include instructions to determine the preference of the user for the first content type based on a tolerance level exhibited by video content consumers when encountering a delay while viewing content of the first content type. In some embodiments, the video content consumers share at least one characteristic with the user.

In some embodiments, the instructions to determine the preference of the user for the first content type include instructions to determine the preference of the user for the first content type based on a tolerance level exhibited by the user when encountering a delay while viewing content of the first content type.

In some embodiments, the instructions to determine the preference of the user for the first content type include instructions to determine the preference of the user for the first content type based on at least one attribute of the user. In some embodiments, the at least one attribute includes one of an age, a gender, and a geographic location of the user.

In some embodiments, the instructions to determine include instructions to determine the preference of the user for the first content type based on feedback provided by the user in response to a previous consumption of content of the first content type.

In some embodiments, the instructions to determine the preference of the user for the second content type include instructions to obtain the preference of the user for the second content type based on content of a user profile of the user.

In some embodiments, the instructions to obtain the preference of the user for the second content type include instructions to retrieve the preference of the user for the second content type from the user profile of the user, which preference was defined by the user.

In some embodiments, the instructions to obtain the preference of the user for the second content type include instructions to retrieve the preference of the user for the second content type from the user profile for the user, which preference was automatically generated in the user profile based on a history of content item consumption of the user.

In some embodiments, the instructions to obtain the preference of the user for the second content type include instructions to automatically generate the preference of the user for the second content type based on a history of content item consumption of the user.

In some embodiments, the instructions to determine the preference of the user for the second content type include instructions to determine the preference of the user for the second content type based on a tolerance level exhibited by video content consumers when encountering a delay while viewing content of the second content type. In some embodiments, the video content consumers share at least one characteristic with the user.

In some embodiments, the instructions to determine the preference of the user for the second content type include instructions to determine the preference of the user for the second content type based on a tolerance level exhibited by the user when encountering a delay while viewing content of the second content type.

In some embodiments, the instructions to determine the preference of the user for the second content type include instructions to determine the preference of the user for the second content type based on at least one attribute of the user. In some embodiments, the at least one attribute includes one of an age, a gender, and a geographic location of the user.

In some embodiments, the instructions to determine the preference of the user for the second content type include instructions to determine the preference of the user for the second content type based on feedback provided by the user in response to a previous consumption of content of the second content type.

Unless otherwise defined, all technical and scientific terms used herein have the same meaning as commonly understood by one of ordinary skill in the art to which the invention pertains. In case of conflict, the specification, including definitions, will take precedence.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

BRIEF DESCRIPTION OF THE FIGURES

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings.

DESCRIPTION OF SOME EMBODIMENTS OF THE INVENTION

Figure 1A:
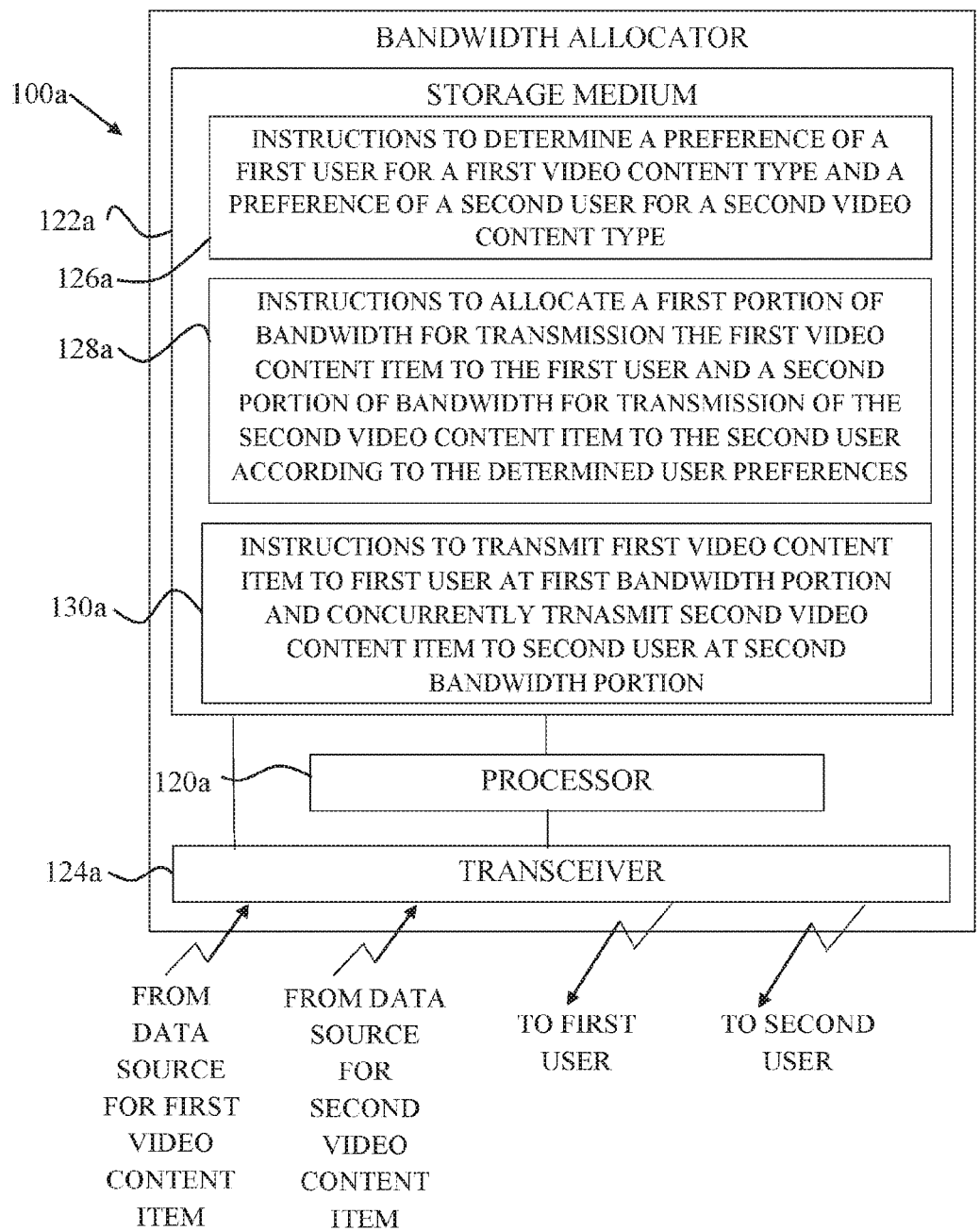
FIGS. 1A and 1B are schematic block diagrams of two embodiments of devices for allocating bandwidth according to embodiments of the teachings herein.

The invention, in some embodiments, relates to the field of bandwidth allocation, and more particularly to devices and methods for allocating bandwidth for data of video content items of two different types, based on preferences of a single user or multiple users for each of the different types of video content items.

It is a goal of the present invention to allocate bandwidth in a data communication network between multiple users consuming video content in parallel, so that the average viewing experience of the users will be improved compared to that experienced when using current methods of bandwidth allocation, for example by reducing the number of times the users experience buffering or downloading delays while watching video content types of high importance to them. Such downloading delays are often marked, in media content display devices, as a "spinning wheel" or "spinning circle" icon.

Specifically, when using prior art methods for priority-setting, bandwidth allocation may be good when differentiating between data packets containing different types of information—text, audio, video, etc. In prior art methods, a router may identify the type of content of received data by looking at tags assigned by the sender of the packets, which tags are contained in the packets' headers. The router may then allocate high bandwidth to video data packets and low bandwidth to other data packets, thus minimizing the probability of a delay, or "spinning wheel" icon, for the user viewing the video.

However, such prior art priority-setting methods apply the same policy to all users, failing to differentiate between users that have different preferences regarding different types of video content. One user may have a strong preference that sport events will be streamed at high quality while not caring so much about video quality during educational programs, and another user may have the opposite attitude. The prior art methods of bandwidth allocation treat both users in the same way, possibly making one of them happy and the other one unhappy, or alternatively making both of them partially happy and partially unhappy.

Additionally, a major factor influencing a user's viewing experience is the tolerance for delays while streaming the content. It is known that the tolerance for delays during display of video content depends on the content type. For example, most users are more tolerant to delays during news broadcasts than to delays during sports events. The prior-art bandwidth allocation methods treat all content types in the same manner, regardless of such information.

It is therefore a goal of the present invention to provide devices and method for bandwidth allocation which take into consideration the specific content type of a video content item being watched by a user, and the user's preference for this specific content type, so as provide a watching experience having fewer delays, or "spinning circles" when the user watches video content items of content types for which he has lower tolerance for interruptions and delays, and possibly having more delays, or "spinning circles", when watching content items for which the user does not mind the delays, thereby improving the user's viewing experience. This goal is to be achieved both when allocating bandwidth to multiple users watching video content items of different types in parallel and when allocating bandwidth to a single user watching multiple video content items of different types sequentially.

In the context of the present application, the term "media content" relates to visual content or combined audio-visual content (e.g., a movie including a sound track).

In the context of the present application, the term "media content item" or "video content item" relates to a segment of media content that can be uniquely identified, such as a movie, a scene from a movie, a video clip, a television program, a scene from a television program, a news report, or a news item within a news report.

In the context of the present application, the term "media content playing device" relates to a device suitable for playing media content, including a visual interface such as a screen for displaying visual content, and in some cases including also an audio interface such as speakers or earphones for playing audio content.

In the context of the present application, the term "content type" relates to an attribute of a video content item that provides information about its contents. Examples include comedy, tragedy, action, drama, fantasy, science fiction, news, sports, education, cooking, self-improvement, and the like. A content type may correspond to a genre used by content producers or content distributors for marking video content, but need not necessarily correspond to such a genre.

In the context of the present application, the term "preference of a user for a content type" relates to a segment of information regarding the user's attitude toward the content type, such as a degree to which the user enjoys watching the video content items of the content type, a level of tolerance the user has to interruptions or delays in display of video content items of the content type, and the like.

In the context of the present application, the term "video content item A is played concurrently with video content item B" relates to two video content items A and B such that there is at least one point in time at which both video content items A and B are being played.

The principles, uses and implementations of the teachings herein may be better understood with reference to the accompanying description and figures. Upon perusal of the description and figures present herein, one skilled in the art is able to implement the invention without undue effort or experimentation.

Before explaining at least one embodiment of the invention in detail, it is to be understood that the invention is not limited in its applications to the details of construction and the arrangement of the components and/or methods set forth in the following description and/or illustrated in the drawings and/or the Examples. The invention can be implemented with other embodiments and can be practiced or carried out in various ways. It is also understood that the phraseology and terminology employed herein is for descriptive purpose and should not be regarded as limiting.

Figure 1B:
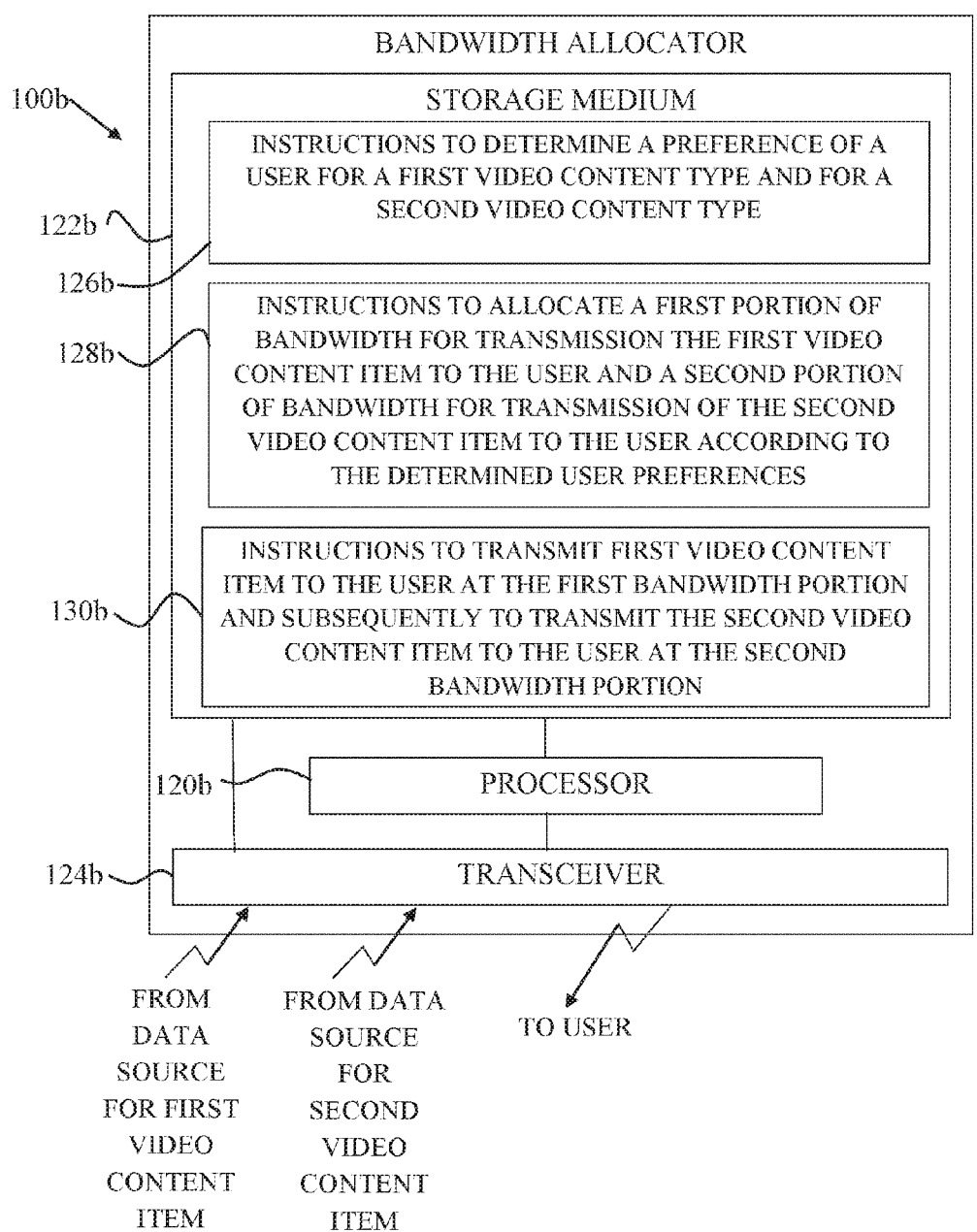

Reference is now made to FIGS. 1A and 1B, which are schematic block diagrams of two embodiments of devices for allocating bandwidth according to embodiments of the teachings herein.

As seen in FIG. 1A, a device 100a for allocating bandwidth in a network (also referred to herein as bandwidth allocator 100a), includes a processor 120a and a storage medium 122a, which is typically a non-transitory computer readable storage medium. Processor 120a is further associated with a communication component, such as a transceiver 124a, for communication with at least one source of media content items, with at least one media content playing device associated with at least one user in the network, with at least one external storage medium, and/or with at least one user interface, as described in further detail hereinbelow with reference to FIG. 2.

As described in further detail hereinbelow, transceiver 124a is adapted to receive, from at least one video content source, a first video content item having a first content type and addressed to a first user in the network, and a second video content item having a second content type and addressed to a second user in the network. The transceiver is further adapted to transmit the first and second video content items to the first and second users respectively, and more specifically, to first and second media content playing devices used by the first and second users, once bandwidth for transmission has been allocated by the processor as described herein.

The storage medium 122a includes instructions to be executed by the processor 120a, in order to carry out various steps of the method described herein, as described in further detail hereinbelow. Specifically, the storage medium includes at least:

instructions 126a to determine a preference of a first user for a first content type of a first video content item and to determine a preference of a second user for a second content type of a second video content item;

instructions 128a to allocate a first portion of the available bandwidth for transmission of the data of the first video content item to the first user and a second portion of the available bandwidth for transmission of data of the second video content item to the second user, where the bandwidth allocated as the first portion is dependent on at least one preference of the first user for the first content type and the bandwidth allocated as the second portion is dependent on at least one preference of the second user for the second content type, and where the first bandwidth portion is different from the second bandwidth portion; and instructions 130a to transmit, via the transceiver 124a, the data of the first video content item to the first user at the bandwidth of the first portion concurrently with transmitting the data of the second video content item to the second user at the bandwidth of the second portion.

Turning to FIG. 1B, it is seen that a bandwidth allocator 100b thereof is substantially similar to bandwidth allocator 100a of FIG. 1A, with slight differences as described herein. As such, the reference numerals of FIG. 1B correspond to those of FIG. 1A.

Bandwidth allocator 100b includes a processor 120b and a transceiver 124b, substantially as those described hereinabove with respect to FIG. 1A, with the exception that transceiver 124b is adapted to receive a first video content item of a first content type and a second video content item of a second content type, both video content items addressed to the same user, for example for viewing the content items in sequence on the same device.

The instructions stored in the storage medium 122b are slightly different from those stored in storage medium 122a, and include at least:

instructions 126b to determine a preference of the user for the first content type and a preference of the user for the second content type;

instructions 128b to allocate a first portion of the available bandwidth for transmission of the data of the first video content item to the user and a second portion of the available bandwidth for transmission of data of the second video content item to the user, where the bandwidth allocated as the first portion is dependent on at least one preference of the user for the first content type and the bandwidth allocated as the second portion is dependent on at least one preference of the user for the second content type, and where the first bandwidth portion is different from the second bandwidth portion; and instructions 130b to transmit, via the transceiver 124b, the data of the first video content item to the user at the bandwidth of the first portion and subsequently to transmit the data of the second video content item to the user at the bandwidth of the second portion.

In some embodiments, bandwidth allocators 100a and 100b may comprise, or form part of, a set-top-box, a router, or another network component in charge of allocating bandwidth in the network serving the media content playing devices.

Figure 2:
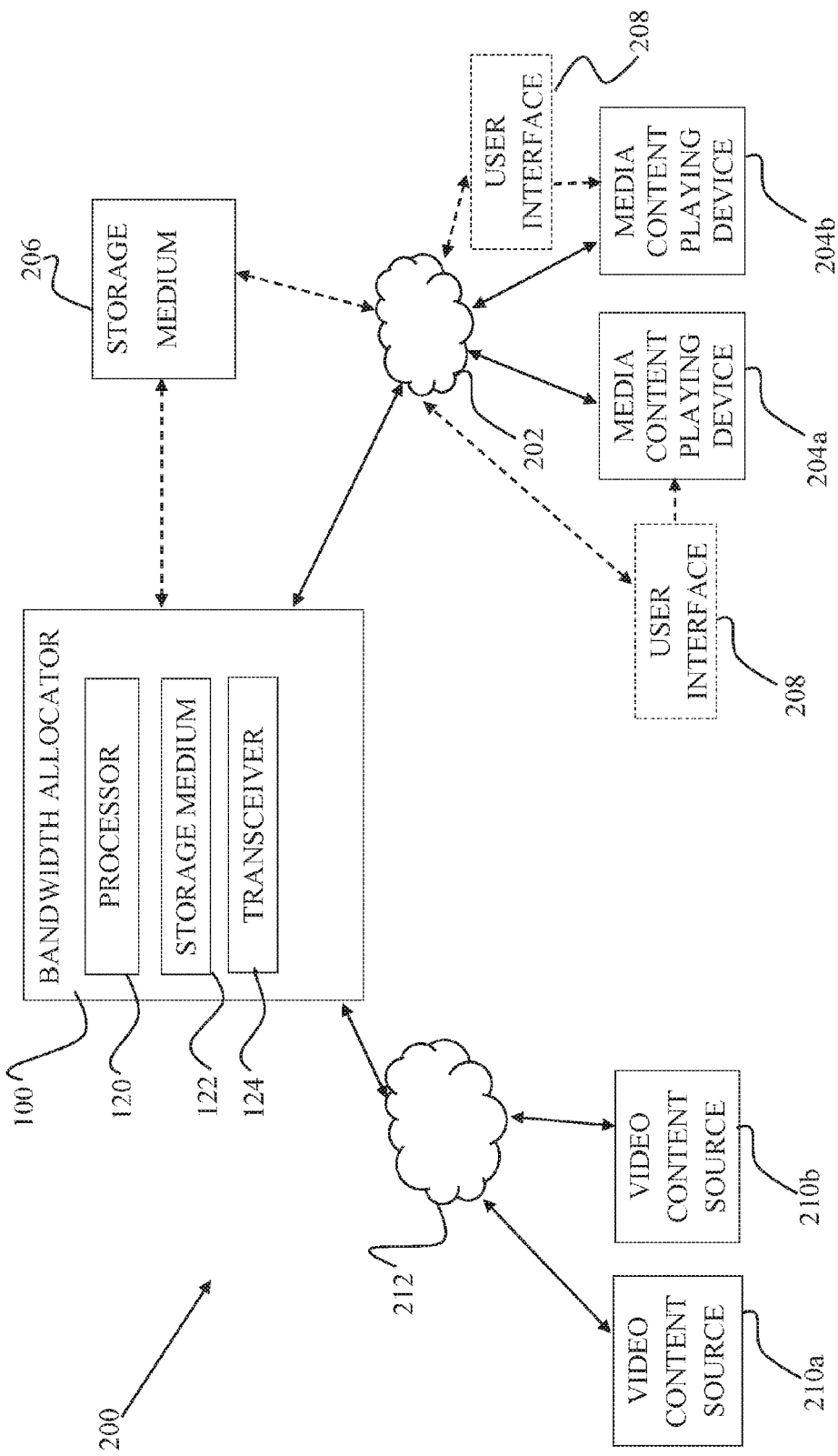
FIG. 2 is a schematic block diagram of a system for allocating bandwidth, the system including the device of FIG. 1A or the device of FIG. 1B, according to an embodiment of the teachings herein.

Reference is now made to FIG. 2, which is a schematic block diagram of a system 200 for allocating bandwidth in a network according to an embodiment of the teachings herein, the system including a device such as bandwidth allocator 100a of FIG. 1A or bandwidth allocator 100b of FIG. 1B.

As seen in FIG. 2, system 200 includes a device 100 for allocating bandwidth in a network 202, for example as described hereinabove with reference to device 100a of FIG. 1A or with reference to device 100b of FIG. 1B, which device is referred to herein as the bandwidth allocator. As discussed hereinabove with respect to FIGS. 1A and 1B, bandwidth allocator 100 includes a processor 120, a storage medium 122, and a transceiver 124.

The system 200 further includes at least one media content playing device, here illustrated as two media content playing devices 204a and 204b, which are adapted to communicate with the bandwidth allocator 100, via the network 202.

Media content playing devices 204a and 204b may be any media content playing device suitable for playing video content items, such as a television, a laptop computer, a desktop computer, a gaming console, or the like. In some embodiments, each media content playing device 204 is functionally associated with a user interface 208, which may include an audio output device such as earphone or one or more speakers, and/or a visual output device, such as a display screen, as well as one or more input devices as described hereinbelow. In some embodiments, each media content playing device 204 further includes a dedicated processor, and/or a dedicated storage medium, which may be a non-transitory computer readable storage medium. The dedicated storage medium may include data relating to media content and/or media content items to be played by the media content playing device 204, device settings, user preferences, and the like.

In some embodiments, each media content playing device 204 is communicably connected to another network, other than network 202, for example via a transceiver associated therewith. More typically, the bandwidth allocator 100 is associated with a local network including the media content playing devices 204, as well as with a second network, which may be used for receiving networked media content, scheduling information, and the like, as described in further detail hereinbelow.

In some embodiments, the bandwidth allocator 100 is further associated with an external storage medium 206, which may be a non-transitory computer readable storage medium such as a storage unit of a server or a database. Storage medium 206 may include user profiles, for example including user specific preferences for different content types, as described in further detail hereinbelow with reference to FIGS. 3A and 3B.

Storage medium 206 may further include data relating to statistically generated user preferences for different content types, as described in further detail hereinbelow with reference to FIGS. 3A and 3B.

In some embodiments, storage medium 206 forms part of the bandwidth allocator 100. In other embodiments, storage medium 206 may be local to network 202, or may be remote therefrom, such as being located in a remote server or in a Cloud network, or accessible via a wide area network or via the Internet.

In some embodiments, the system 200 may further include one or more user interfaces, which may be user interfaces 208 associated with the media content playing devices 204a and 204b (as illustrated in FIG. 2), or may be independent of the media content playing devices. The user interfaces are each adapted to receive input from a user, such as input indicating the user's level of happiness with how a video content item was displayed and/or a level of the user's frustration with interruptions in the displayed video content item.

In some embodiments, the one or more user interfaces 208 are each associated with one of media content display devices 204a and 204b, such that the user's input is provided directly to the media content display device, and from there is provided, via network 202, to bandwidth allocator 100 and/or to storage medium 206. In other embodiments, the one or more user interfaces 208 may be connected directly to network 202, such that the user provides input via a specific user interface identified with the user, and that input may be provided, via network 202, to bandwidth allocator 100 and/or to storage medium 206, and associated with the user therein.

The system 200 further includes at least one video content source, here illustrated as two video content sources 210a and 210b, connected to the bandwidth allocator 100 via a network 212. Video content sources 210a and 210b include data for a plurality of video content items, and provide such data upon request, for example via network 212. Video content sources 210a and 210b may be any suitable type of data source, such as, for example, websites including video data, for example www.youtube.com, www.hulu.com, www.netflix.com, and the like; Internet TV operators such as Verizon, cable television data sources such as Comcast Cable, satellite television data sources such as Dish Network and DirecTV, and the like.

In some embodiments, network 202 may be a local area network (LAN), such as a home or office network using an Ethernet, IEEE 802.2, or IEEE 802.11 network, whereas network 212 may be a wide area network (WAN) or may form part of the Internet. In some such embodiments, network 202 may communicate with network 212, for example via a router (not shown).

Communication between bandwidth allocator 100 and media content playing devices 204, and between bandwidth allocator 100 and video content sources 210, within networks 202 and 212, may be in accordance with any electronic communication protocol suitable for remote communication between two electronic devices, such as HTTP, FTP, and the like.

Figure 3A:
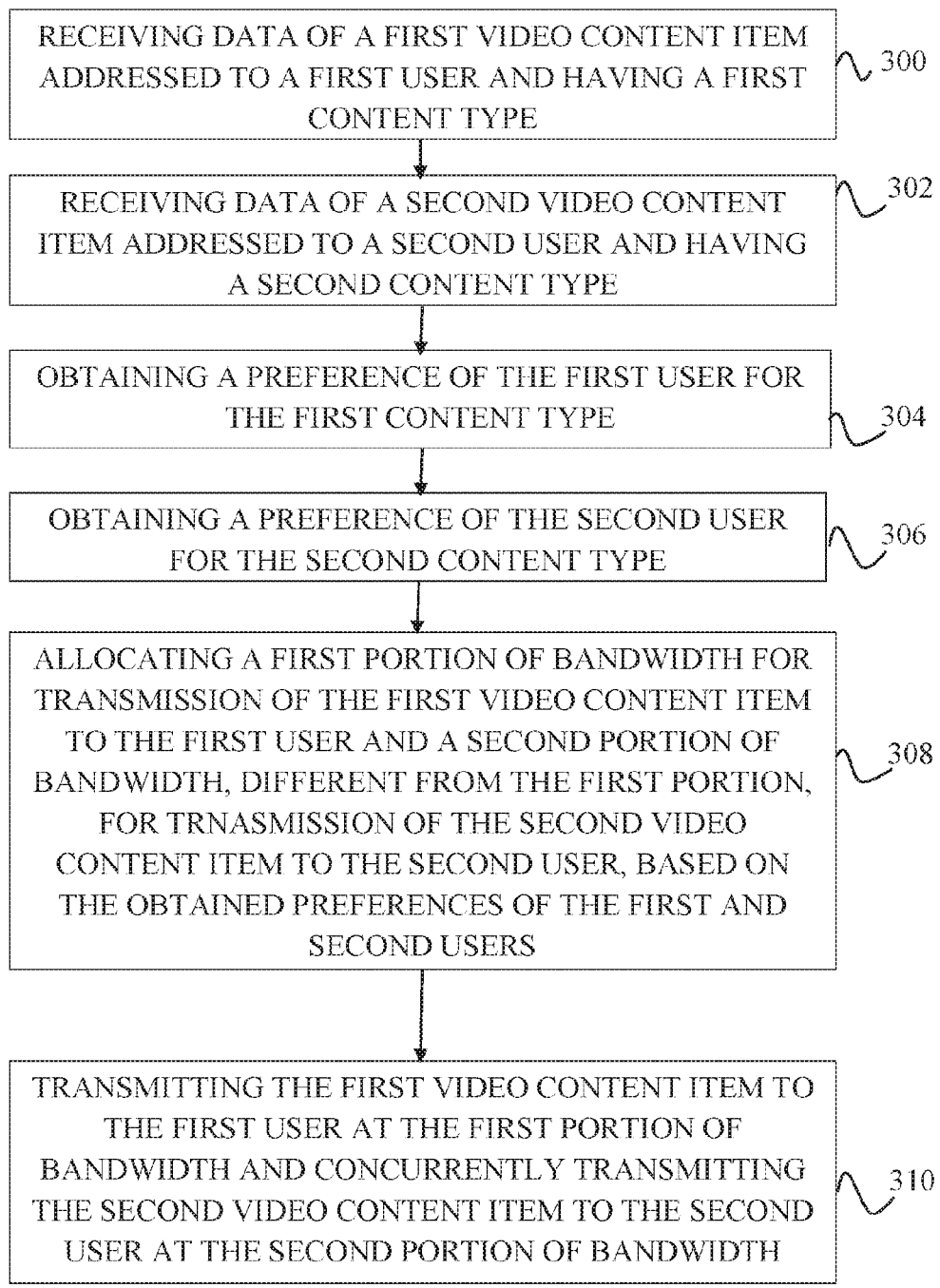
FIGS. 3A and 3B are flow charts of two embodiments of methods for allocating bandwidth using a suitable device and system according to embodiments of the teachings herein, wherein the method of FIG. 3A uses the device of FIG. 1A and the system of FIG. 2, and the method of FIG. 3B uses the device of FIG. 1B and the system of FIG. 2.
Figure 3B:
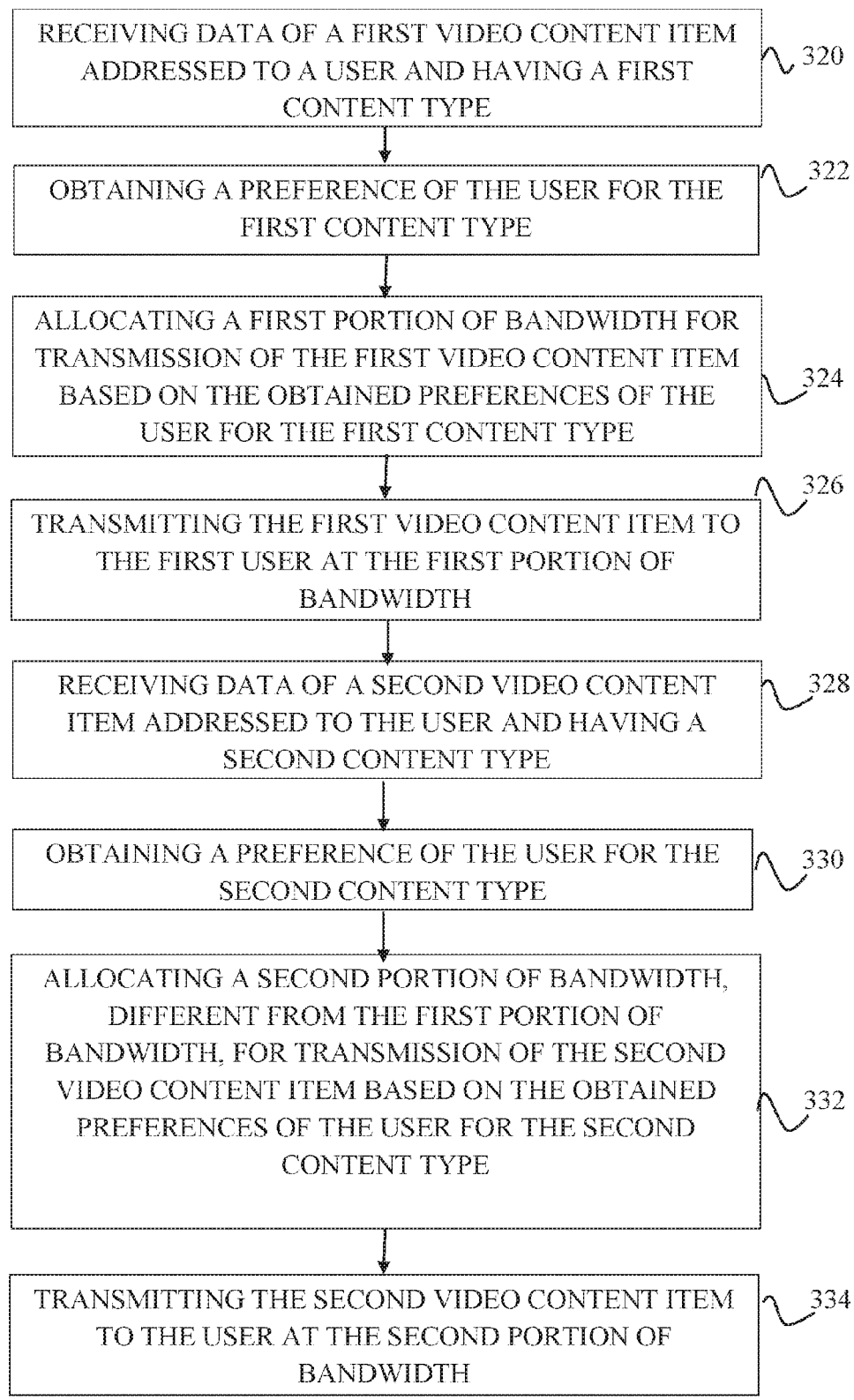

Reference is now additionally made to FIGS. 3A and 3B, which are flow charts of two embodiments of methods for allocating bandwidth using a suitable device and system according to embodiments of the teachings herein, wherein the method of FIG. 3A uses the bandwidth allocator 100a of FIG. 1A and the system 200 of FIG. 2, and the method of FIG. 3B uses the device 100b of FIG. 1B and the system 200 of FIG. 2.

Turning to FIG. 3A, it is seen that in a first step, indicated by reference numeral 300, data of a first video content item addressed to a first user and having a first content type, is received, typically at bandwidth allocator 100a, for example by transceiver 124a thereof. Additionally, data of a second video content item addressed to a second user and having a second content type, is received, typically at bandwidth allocator 100a, for example by transceiver 124a thereof, as seen at step 302.

As known in the art, step 300 is typically preceded by the first user requesting the first video content item, for example by clicking on a video clip on a website or by requesting a Video-On-Demand (VOD) item in a set top box. Similarly, step 302 is typically preceded by the second user requesting the second video content item in a similar manner.

At step 304, the bandwidth allocator 100a obtains at least one preference of the first user for the first content type, and at step 306 the bandwidth allocator 100a obtains at least one preference of the second user for the second content type. It will be appreciated that steps 304 and 306 may occur concurrently or sequentially, in any suitable order. The preferences of the first and second users for the first and second content types, respectively, may be obtained in numerous different ways.

It will be appreciated that for brevity purposes the description below relates to preferences of a user for a specific content type, the description is applicable to the first user with respect to the first content type as well as to the second user with respect to the second content type.

Preferences of a user for a specific content type may include an indication of whether or not, or how much, the user likes the specific content type, an indication of a tolerance the user has for interruptions in the display of a video content item of that content type, an indication of a maximal number of interruptions the user may tolerate during display of a video content item of the specific content type, and the like.

In some embodiments, the preference of the user for the specific content type is obtained based on content of a user profile of the user, which user profile may be stored within the bandwidth allocator (100a or 100b), or in a remote location, such as in a media content playing device 204 used by the user or in a database or other storage location, such as in storage medium 206.

In some embodiments, the user's preferences may be stored directly in the user profile, and may be obtained directly from the user profile. In some such embodiments, the user's preferences are defined by the user, for example when setting up the user profile.

As an example, John Lowry is streaming a basketball game taking place as part of the Rio Olympics. John is a sports fan, hates interruptions when he watches sports, and gets extremely frustrated when seeing a "spinning wheel" appear on his screen while data of the game he is watching is downloading. By contrast, though John watches the TV news, he finds interruptions in news broadcasts less frustrating, as he feels there is reduced suspense in the news broadcast. When setting up his user profile for streaming of video content, John defined in his user profile that he does not want interruptions during sports games, and does not mind interruptions during news broadcasts. The bandwidth allocator may then obtain John's preference for having no interruptions during the streamed basketball game directly from John's user profile.

In some embodiments, the user's preferences may be automatically generated, deduced, or computed, based on a history of content item consumption of the user, which history is stored in the user profile. Returning to the example of John Lowry above, John's user profile may indicate that John watches many sports video content items and few news content items. John's user profile may further indicate that in each time in which low bandwidth was used for transmission of a sports game video content item, John gave up and stopped watching the video content item immediately after the first interruption or "spinning wheel" delay during the display of the sports game, and that in each time in which low bandwidth was available while used for transmission of a news video content item, John did not stop watching the video content item even after multiple interruptions in the display of the news. As such, the bandwidth allocator, by software running on the processor thereof, may determine, based on the information retrieved from the user profile, that John has a low tolerance for interruptions during sports games and that John would not tolerate interruptions during the streamed basketball game, and may generate a user preference indicating that John would prefer no interruptions during sports content.

In some embodiments, the preference of the user for the specific content type is obtained based on a tolerance level exhibited by video content consumers when encountering a delay, interruption, or "spinning wheel" while viewing content of the specific content type. The information regarding the tolerance level of other video content consumers may be stored locally within the bandwidth allocator (100a or 100b), or in a remote location, such as in storage medium 206 or in another remote networked location, such as on a dedicated server or in the Cloud. In some embodiments, the video content consumers used to determine the tolerance level share at least one characteristic with the user.

For example, Sarah is a 30 year-old mother of two, who loves watching cooking shows to relax after a long day, and is beginning to watch the latest episode of 'Master Chef' on VOD. In order to determine Sarah's preferences with respect to delays or interruptions in the display of cooking shows, the processor (120a or 120b) of the bandwidth allocator (100a or 100b) accesses a database listing the preferences of other users, and specifically selects from the database data relating to other mothers in their 30s. According to the data in the database, many mothers in their 30s allow for one or two delays or interruptions in cooking shows before becoming frustrated and changing the video content item being watched. The bandwidth allocator then uses the information determined from the database as Sarah's preference. It will be appreciated that in this embodiment the database includes information relating to specific users, and that information is used to determine the current user's, or Sarah's, preference.

In another embodiment, the preference of the user for the specific content type is obtained based on at least one attribute of the user, such as the user's age, gender, and geographical location. Specifically, the preference of the user is statistically determined based on the preferences of other users having the same attribute. For example, using Sarah of the previous example as a model, if statistically mothers in their 30s have low tolerance for delays and interruptions during drama shows, the bandwidth allocator will consider Sarah's preference to be identical to the commonly found preference for other mothers in their 30s, regardless of Sarah's personal preferences.

In some embodiments, the user's preference is determined based on feedback provided by the user in response to a previous consumption of content of the specific content type. The feedback may be provided by the user via a user interface, such as user interfaces 208a and 208b of FIG. 2, and may be stored within the bandwidth allocator or in a remote location, such as in storage medium 206, for future use. For example, Lewis watched a horror movie on his laptop. When the movie was finished, Lewis was prompted to provide input regarding his experience watching the movie, such as to indicate the quality of display of the movie, to indicate the number of delays or interruptions experienced, to indicate a level of frustration from such delays or interruptions, and/or to indicate whether he would watch the movie again if it had the same quality. Lewis provided the input, which was stored in Lewis's user profile or in a database or storage medium. When Lewis next wants to watch a horror movie, the bandwidth allocator (100a or 100b) retrieves the stored feedback previously provided by Lewis, and determines Lewis's preferences for display of horror movies based on that feedback.

As seen at step 308, once the first user's preference for the first content type, and the second user's preference for the second content type, are determined by the bandwidth allocator 100*a*, the bandwidth allocator allocates a first portion of the available bandwidth for transmission of the first video content item to the first user based on the preference of the first user for the first content type, and allocates a second portion of the available bandwidth for transmission of the second video content item to the second user based on the preference of the second user for the second content type. The first portion of available bandwidth and the second portion of available bandwidth are preferably not equal.

Following allocation of the bandwidth, at step 310 the data of the first video content item is transmitted, via transceiver 124*a*, to the first user at the first portion of the available bandwidth, concurrently with transmission of the data of the second video content item to the second user at the second portion of available bandwidth.

It will be appreciated that in some embodiments, the first user and the second user are the same user, watching the first and second video content items concurrently on different devices or using different display channels on the same device, such as in a split screen.

Turning to FIG. 3B, it will be appreciated that the method of FIG. 3B is substantially similar to the method of FIG. 3A, with the exception that in FIG. 3B the first and second video content items are addressed to the same user, who may watch the two video content items in sequence, and not concurrently. As such, the steps of the method of FIG. 3B may be carried out at a different order than the steps of the method of FIG. 3A, though they need not necessarily be.

As seen in FIG. 3B, in step 320, data of a first video content item addressed to the user, and having a first content type, is received, typically at bandwidth allocator 100*b*, for example by transceiver 124*b* thereof. As known in the art, step 300 is typically preceded by the user requesting the first video content item, for example by clicking on a video clip on a website or by requesting a Video-On-Demand (VOD) item in a set top box.

At step 322, bandwidth allocator 100*b* obtains at least one preference of the user for the first content type, substantially as described hereinabove with respect to FIG. 3A. Once the user's preference for the first content type is obtained, at step 324 bandwidth allocator 100*b* allocates a first portion of the available bandwidth for transmission of the first video content item to the user based on the preference of the user for the first content type, and at step 326 the data of the first video content item is transmitted to the user via transceiver 124*b*.

At step 328, which may occur prior to, concurrently with, or subsequently to step 320, data of a second video content item addressed to the user and having a second content type, is received, typically at bandwidth allocator 100*b*, for example by transceiver 124*b* thereof. As discussed hereinabove with respect to step 320, step 328 is typically preceded by the user requesting the second video content item as described hereinabove.

At step 330, bandwidth allocator 100*b* obtains at least one preference of the user for the second content type, substantially as described hereinabove with respect to FIG. 3A. Once the user's preference for the second content type is obtained, at step 332 bandwidth allocator 100*b* allocates a second portion of the available bandwidth for transmission of the second video content item to the user based on the preference of the user for the second content type, the second portion of bandwidth being different from the first portion of bandwidth. Subsequently, at step 334 the data of the second video content item is transmitted to the user via transceiver 124*b*.

It will be appreciated that the data of the first and second video content items may be transmitted to the user concurrently, for example using two different media item display devices or two different channels on the same device, or may be transmitted to the user sequentially via one device or two different devices.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A method for allocating bandwidth in a data communication network having available bandwidth, the data communication network including a bandwidth allocator and nodes, at least one of the nodes being a user terminal, the bandwidth allocator being adapted to receive content from outside the data communication network and to distribute the content to the nodes of the data communication network, the method comprising:

a. receiving data of a first video content item having a first content genre addressed to a user terminal in the network;

b. determining, by the bandwidth allocator, at least one preference of a user associated with said user terminal for said first content genre, the determining being based on a tolerance level exhibited by video content consumers when encountering a delay while viewing content of said first content genre;

c. following said determining, and responsive to said receiving said data of said first video content item, allocating a first portion of the available bandwidth for transmission to said user terminal, wherein a bandwidth of said first portion of the available bandwidth is dependent on said at least one preference of said user associated with said user terminal for said first content genre;

d. transmitting said data of said first video content item to said user terminal at said bandwidth of said first portion of said available bandwidth;

e. receiving data of a second video content item having a second content genre addressed to said user terminal, wherein said second content genre is different from said first content genre;

f. responsive to receiving said data of said second video content item, allocating a second portion of said available bandwidth for transmission to said user terminal, wherein a bandwidth of said second portion of the available bandwidth is dependent on at least one preference of said user for said second content genre, wherein said bandwidth of said second portion is different from said bandwidth of said first portion; and g. transmitting said data of said second video content item to said user terminal at said bandwidth of said second portion of said available bandwidth, wherein said steps a-g are all carried out by the bandwidth allocator.

2. The method of claim 1, wherein said determining said at least one preference of said user for said first content genre is also based on content of a user profile of said user.

3. The method of claim 2, wherein said user profile was defined by said user.

4. The method of claim 2, wherein said user profile is based on a history of content item consumption of said user.

5. The method of claim 1, wherein said determining said at least one preference of said user for said first content genre is also based on a tolerance level exhibited by said user when encountering a delay while viewing content of said first content genre.

6. The method of claim 5, wherein said tolerance level is automatically learned by said bandwidth allocator at at least one previous time when said user encountered a delay while viewing content of said first content genre.

7. The method of claim 1, wherein said determining said at least one preference of said user for said first content genre is also based on at least one attribute of said user.

8. The method of claim 7, wherein said at least one attribute comprises one of an age, a gender, and a geographic location of said user.

9. The method of claim 1, wherein said determining said at least one preference of said user for said first content genre is also based on feedback provided by said user in response to a previous consumption of content of said first content genre.

10. A bandwidth allocating device for allocating bandwidth in a data communication network having available bandwidth, the bandwidth allocating device being adapted to receive content from outside the data communication network and to distribute the content to nodes of the data communication network, wherein at least one of the nodes is a user terminal, the bandwidth allocating device comprising:

a. a transceiver for receiving data of a first video content item having a first content genre addressed to a user terminal in the data communication network and for receiving data of a second video content item having a second content genre addressed to said user terminal, wherein said second content genre is different from said first content genre;

b. a processor functionally associated with said transceiver; and c. a non-transitory computer readable storage medium for instructions execution by the processor, the non-transitory computer readable storage medium having stored:

i. instructions to determine at least one preference of a user associated with said user terminal for said first content genre based on a tolerance level exhibited by video content consumers when encountering a delay while viewing content of said first content genre;

ii. instructions to determine at least one preference of said user for said second content genre;

iii. instructions to allocate a first portion of the available bandwidth for transmission of said data of said first video content item to said user terminal and to allocate a second portion of the available bandwidth for subsequent transmission of said data of said second video content item to said user terminal, wherein a bandwidth of said first portion of the available bandwidth is dependent on said at least one preference of said user for said first content genre and a bandwidth of said second portion of the available bandwidth is dependent on said at least one preference of said user for said second content genre, wherein said bandwidth of said second portion is different from said bandwidth of said first portion; and iv. instructions to transmit, via said transceiver, said data of said first video content item to said user terminal at said bandwidth of said first portion of said available bandwidth and subsequently to transmit said data of said second video content item to said user terminal at said bandwidth of said second portion of said available bandwidth.

\* \* \* \* \*